(12) United States Patent
Habib et al.

(10) Patent No.: US 8,537,193 B1
(45) Date of Patent: Sep. 17, 2013

(54) WIRELESS VIDEO CONFERENCING WITH MOBILITY

(75) Inventors: Ahsan Habib, Olathe, KS (US);
Pallavur Sankaranaraynan, Overland Park, KS (US); Catherine Habib, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 209 days.

(21) Appl. No.: 13/024,966

(22) Filed: Feb. 10, 2011

Related U.S. Application Data

(63) Continuation of application No. 11/531,576, filed on Sep. 13, 2006, now Pat. No. 7,916,166.

(51) Int. Cl.
*H04N 7/14* (2006.01)
(52) U.S. Cl.
USPC .................. 348/14.01; 348/14.02; 348/14.08

(58) Field of Classification Search
USPC ............. 348/14.01–14.16; 455/435.1, 435.2, 455/436
See application file for complete search history.

(56) References Cited

U.S. PATENT DOCUMENTS

| | | | | |
|---|---|---|---|---|
| 7,149,524 | B2 * | 12/2006 | Reynolds | 455/437 |
| 7,916,166 | B1 * | 3/2011 | Habib et al. | 348/14.08 |
| 2006/0238608 | A1 * | 10/2006 | Lee et al. | 348/14.01 |
| 2008/0004021 | A1 * | 1/2008 | Sanjay | 455/436 |

* cited by examiner

*Primary Examiner* — Melur Ramakrishnaiah

(57) ABSTRACT

A method, system, and computer-readable media are provided for managing a handoff of a video session including a plurality of devices. The method can include monitoring a signal strength in a first access technology of a mobile device within a first video session. The method can additionally include detecting a change in the signal strength of the at least one mobile device and determining a second access technology for the mobile device. Moreover, the method can include establishing a second video session using the second access technology for the mobile device and the other devices within the first video session.

15 Claims, 3 Drawing Sheets

WIRELESS VIDEO CONFERENCING WITH MOBILITY

CROSS-REFERENCE TO RELATED APPLICATIONS

This application is a continuation of prior application Ser. No. 11/531,576, filed Sep. 13, 2006, which is herein incorporated by reference.

STATEMENT REGARDING FEDERALLY SPONSORED RESEARCH OR DEVELOPMENT

Not applicable.

BACKGROUND

Conventionally, streaming video content information, such as video conferencing for example, may be done over wire line networks as such networks may include enough bandwidth to support the transmission of video information at reasonable efficiency speeds. However, it has become a growing trend for users to employ mobile devices such as cellular phones, laptops, personal digital assistants, etc., to communicate with one another. As such, there is a need to be able to push video content information across users of such mobile devices at the same reasonable speeds obtained with wire line networks.

Some advancements have been made in streaming video content to mobile devices. Typically, a user may be able to request and download a streaming video from a content server to their mobile device. However, communicating with streaming video, as with a live video conference, between mobile devices is absent in conventional prior art methods and may be a more challenging task of accomplishing. The task of conducting a video conference between mobile devices may prove to be challenging as the problem of having a lack of resources/bandwidth within wireless networks for conducting a video conference may need to be addressed. Conventionally, there is a limited amount of bandwidth that is available for video information to be sent or received by a mobile device. This limitation may be due to the limited amount of bandwidth available in the radio frequency (RF) spectrum. Since the bandwidth is limited, conventional methods for conducting a video conference session may produce a poor quality video session or may just drop the video session.

Additionally, the problem of handing off a video session when a mobile device migrates away from a supporting base station to another supporting base station may need to be addressed as well. The present invention is disclosed to provide a system, method, and computer-readable media for solving these problems.

SUMMARY

The presenting invention is defined by the claims below. Embodiments of the present invention solve at least the above problems by providing a system, method, and computer readable media for, among other things, managing a handoff of a video session.

In a first aspect, a method is provided for managing a handoff of a video session including a plurality of devices. The method includes monitoring a signal strength in a first access technology of a mobile device within a first video session, wherein the first video session includes the mobile device and other devices connected with the mobile device. Additionally, the method includes detecting a change in the signal strength of the mobile device and determining a second access technology for the mobile device. Moreover, the method includes establishing a second video session using the second access technology for the mobile device and the other devices.

In a second aspect, tangible computer-readable media having computer-useable instructions embodied thereon are provided for performing a method of managing a handoff of a video session including a plurality of devices. In such an aspect, the method includes identifying a communication channel and identifying an access technology. Furthermore, the method includes determining an amount of space within the communication channel needed for items of video information based on the access technology. Additionally, the method includes modifying items of data information within the communication channel in order to allocate space for the items of video information within the communication channel. Moreover, the method includes pushing the items of video information through the allocated space, wherein the items of video information include buffered video information.

In a third aspect, a system is provided for managing a handoff of a video session including a plurality of devices. The system includes a mobility manager for detecting a change in a signal strength of a mobile device within a first video session, establishing a second video session using an access technology for the mobile device and other devices connected with the mobile device, and buffering the first video session. The system may further include a resource manager for determining an amount of space within the communication channel for the second video session based on the access technology, and modifying data information within the communication channel in order to allocate space for the second video session within the communication channel.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
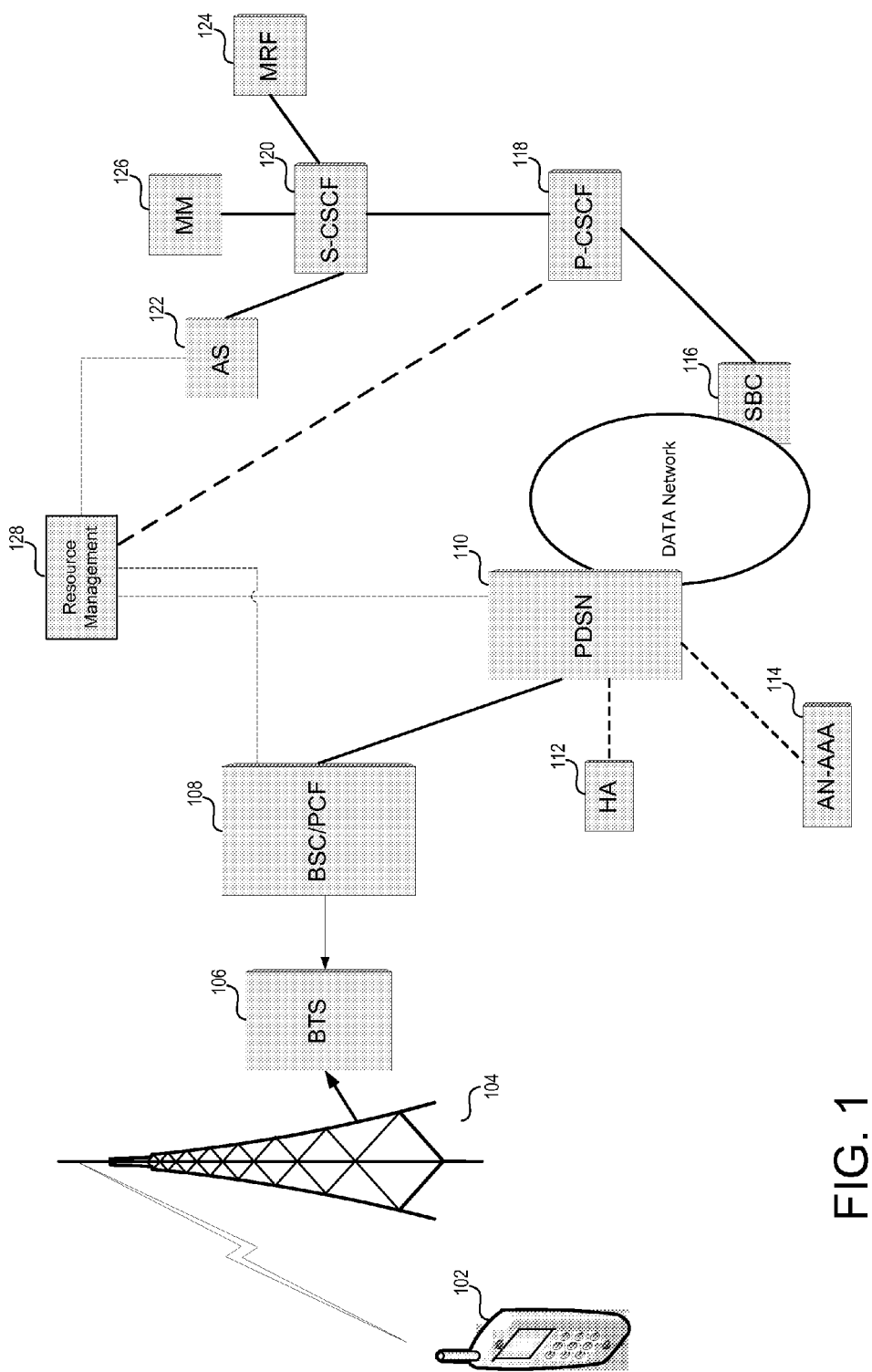
FIG. 1 is an embodiment of a system for implementing the present invention.

Embodiments of the present invention provide systems, methods, and computer-readable media for managing a handoff of a video session including one or more mobile devices. Firstly, the invention provides ways for solving the issue of lack of resources in wireless networks for conducting video conference sessions between mobile devices. Secondly, the invention provides ways for solving the problem of mobile devices migrating to other supporting base stations during the middle of a video conference session.

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

FIG. 1 is an embodiment of a system 100 for implementing the present invention. Mobile device 102 may be or can include a laptop computer, a network-enabled cellular telephone (with or without media capturing/playback capabilities), a wireless email client, or other software client. The mobile device 102 may also include a machine or device to perform various tasks including video conferencing, web browsing, search, electronic mail (email) and other tasks, applications and functions. Mobile device 102 may additionally be a portable media device such as digital camera devices, digital video cameras (with or without still image capture functionality), media players such as personal music players and personal video players, and other portable media devices. The mobile device 102 can include a communication interface that can allow the mobile device 102 to transmit information via radio signals to a communication tower 104.

The Base Transceiver Station (BTS) 106 contains equipment for transmitting and receiving of radio signals (transceivers) from a communication tower 104. BTS 106 also has other equipment for encrypting and decrypting communication with the Base Station Controller (BSC) 108. The BSC 108 may be configured to receive a radio signal that is converted into Time Digital Multiplexing (TDM). In an embodiment, a BSC can have a plurality of BTSs under its control. The BSC 108 may handle the allocation of radio channels, may receive measurements from mobile devices, and can control handovers from one BTS to another BTS. Another function of the BSC 108 is to act as a concentrator of communication sessions where many different low capacity connections to the BTSs (with relatively low utilization) become reduced to a smaller number of connections towards a Mobile Switching Center (MSC) (with a high level of utilization). The BSC 108 may be configured to receive a TDM signal from the BTS 106. The BSC may also be configured to send voice information from the TDM signal to the MSC and data information to a Packet Data Serving Node (PDSN) 110.

The PDSN 110 may be a component of a mobile network. The mobile network may be, for example, a CDMA2000, W-CDMA, UMTS, UTRAN, or FOMA mobile network. The PDSN 110 may act as a connection point between the Radio Access and Internet Protocol (IP) networks. The PDSN 110 component may be responsible for managing Point-to-Point Protocol (PPP) sessions between the mobile device's core IP network and the mobile device. The Home Agent (HA) 112 may be a router located in a home network of the mobile device 102. The HA 112 allows a mobile device to connect to the Internet or data network by assigning an IP address and binding it to a Care-of-Address (COA). The HA 112 can forward packets to an appropriate network when a mobile device is away from its home area or home network. An AN-AAA server 114 is a server program that handles user requests for access to a network, and provides authentication, authorization, and accounting (AAA) services. The AN-AAA server 114 may interact with network access servers, gateway servers, databases, and directories containing user information. A Session Border Controller (SBC) 116 may be a device used in some Voice over Internet Protocol (VoIP) networks to exert control over the signaling and media streams involved in setting up, conducting, and tearing down calls. The SBC 116 may be put into the signaling and/or media path between the party making a call and the party receiving the call. In an embodiment, the SBC 116 may act as a VoIP phone when it receives a call from a calling party, and can place a second call to the called party. The effect of this behavior may be that the signaling traffic and media traffic (voice, video etc) crosses the SBC. This behavior is also prevalent during conference communications.

A Call Session Control Function (CSCF) can act as Proxy CSCF (P-CSCF) 118 or Serving CSCF (S-CSCF) 120. The CSCF may serve as a centralized routing engine, policy manager, and policy enforcement point to facilitate the delivery of multiple real-time applications using IP transport. The CSCF may use dynamic session information to manage network resources (feature servers, media gateways, and edge devices). The CSCF may also use dynamic session information to provide advance allocation of these resources depending on the application and user context. The P-CSCF 118 may be the first contact point within the IP Multimedia Subsystem (IMS) for the subscriber. The P-CSCF may accept requests and can serve the requests internally or may forwards the requests. The S-CSCF 120 may be responsible for identifying the mobile device's service privileges, selecting access to the home network application server, and providing access to that server.

The Application Server (AS) 122 may be a video conferencing server or any type of server that handles the video mixing at the signaling layer. Multimedia Resource Function Controller (MRFC) 124 may be configured to control the media stream resources in a Multimedia Resource Function Processor (MRFP). The MRFC 124 can interpret information coming from an AS 122 and S-CSCF 120 and can control the MRFP accordingly. It may also generate Call Detail Records (CDRs). The MRFP can provide a wide range of functions for multimedia resources, including provision of resources to be controlled by the MRFC, mixing of incoming media streams, sourcing media streams (for multimedia announcements), and processing of media streams.

The Mobility Manager (MM) 126 may be a system that maintains the state of sessions being directed from the network in the process of setting up a service. The MM 126 can manage a handoff of a session based on three pre-handoff conditions. A first condition may be based on the signal strength from the base stations to the mobile devices. The MM 126 can average the signal strength and can make the condition positive for a handoff based on preconfigured threshold limits. A second condition may use a time-sampling algorithm to detect the length the signal strength remains at or above a predetermined threshold before making the condition positive for the handoff. A third condition may be based on the reservation of appropriate channel bandwidth by the Resource Manager (RM) 128. Once the channel bandwidth has been reserved, the MM 126 may consider the condition to be positive. The handoff may be accomplished based on a make and break model where the second session to the new access network and/or device is first initiated by the network, and for an instance in time there may be two active sessions for that mobile device. On the confirmation of a successful establishment of the second session, the first session may be terminated. The MM 126 can also be configured with business rules or policies to initiate the handoff if there is a loss of signal. For example, the MM 126 can be configured to handoff to an available access network with a lower delivery cost such as WiFi or 4G for example. In order to facilitate a successful handoff, the MM 126 can buffer the media transactions occurring during the handoff process (the first session) so that users do not experience a disruption of their services, e.g., during a video session where there's a loss of media that may result in pixilation.

The Resource Manager (RM) 128 is a component that can provide the ability to reserve resources, bandwidth for example, by manipulating the frequency spectrum of any wireless access technology. Such access technologies can include, but are not limited to, IEEE 802.11, IEEE 802.15, 802.16. The RM 128 may accomplish the reservation of resources by monitoring the available usage in a particular channel associated with various wireless frequency spectrum agnostics of the underlying wireless technology being used. The RM 128 may also be configured to ensure that higher priority traffic gets assigned a pipe of bandwidth within the channel without affecting the other traffic traversing the channel. The RM 128 can also ensure that media is transcoded to a proper codec for all end points (devices within a session) when sessions are handed off to other access networks that may provide higher bandwidth capabilities. Ensuring the media is transcoded to a codec that all end points can support may be accomplished by interfacing the RM 128 with the MM 126 so that the RM 128 can detect the conditions for successful handoff completion.

Figure 2:
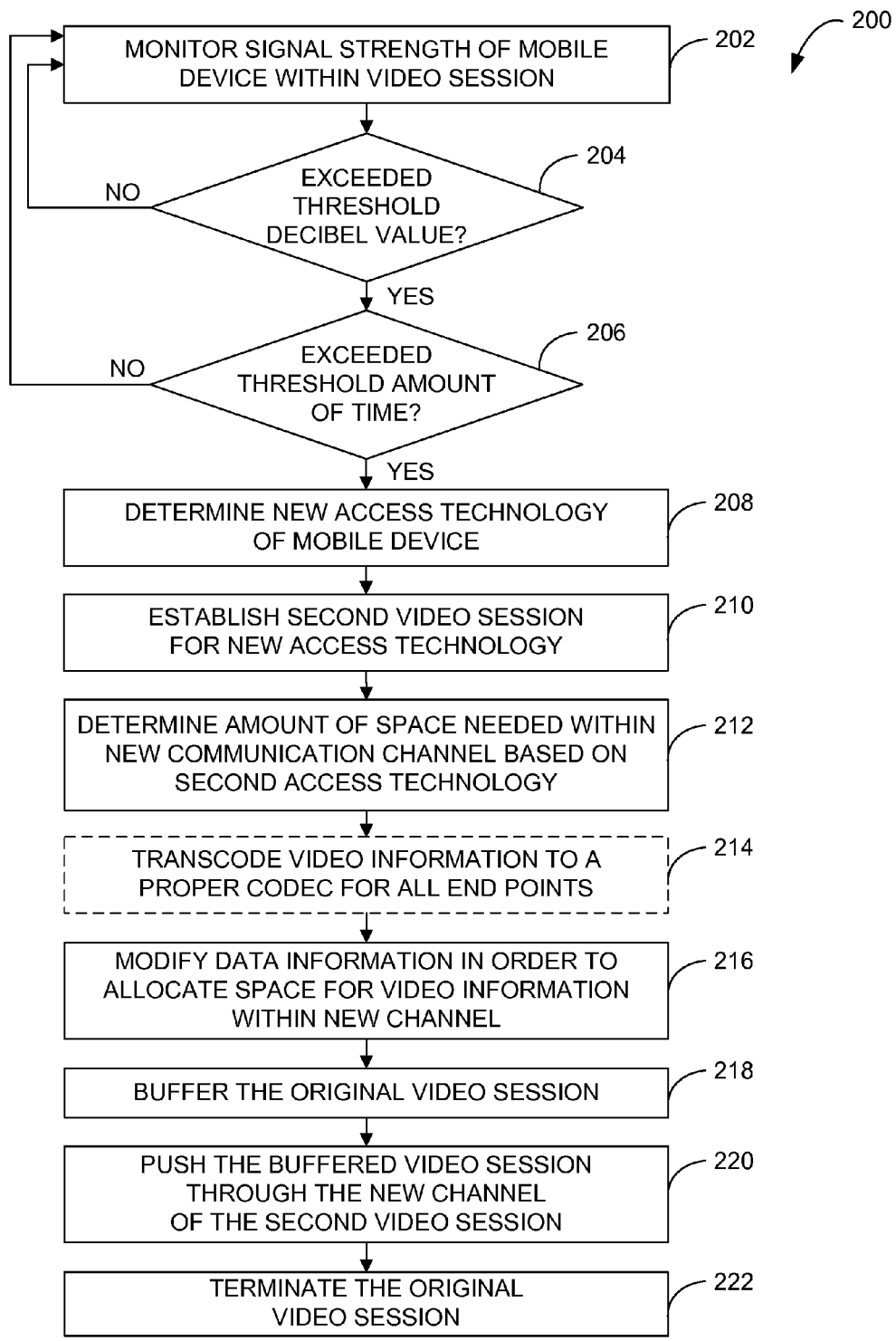
FIG. 2 illustrates a process for managing a handoff of a video session in a method.

FIG. 2 illustrates a process for managing a handoff of a video session in a method 200. In an embodiment, the video session can include a mobile device and one or more other devices. The other devices may also be mobile devices. Additionally, the other devices may be a desktop computer or a server such as a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

At operation 202, the signal strength of a mobile device within a video session is monitored. At operation 204, a determination is made as to whether the mobile device's signal strength has exceeded a predetermined threshold decibel value. The predetermined threshold decibel value may be set by an administrator or developer authorized to configure a system of the invention. If the mobile device's signal strength has not exceeded the predetermined threshold decibel value, then the mobile device's signal strength can be further monitored at operation 202. However, if the mobile device's signal strength exceeds the predetermined threshold decibel value, then a second determination can be made at operation 206 as to whether the threshold decibel value has been exceeded for a predetermined threshold amount of time. The predetermined threshold amount of time may be set by an administrator or developer authorized to configure a system of the invention. If the mobile device's signal strength has not exceeded the predetermined threshold decibel value for a predetermined threshold amount of time, then the mobile device's signal strength can be further monitored at operation 202. However, if the mobile device's signal strength exceeds the predetermined threshold decibel value for the predetermined threshold amount of time, then the method may proceed to operation 208.

At operation 208, a subsequent access technology for the mobile device is determined. In an embodiment, the subsequent access technology is determined by scanning the surrounding area of the mobile device for a signal of an access technology supported by the mobile device. In such an embodiment, the subsequent access technology may be selected if the mobile device will be able to acquire a signal strength with the potential subsequent access technology beyond a second predetermined threshold decibel value. The second predetermined threshold decibel value may also be set by an administrator or developer authorized to configure a system of the invention. In an embodiment, the subsequent access technology may be different than the original access technology if the mobile device migrates to a BSC that supports a different access technology than the original. In other embodiments, the subsequent access technology may be the same as the original in cases where the mobile device migrates to a BSC that can support the same access technology as the original.

In another embodiment, operations 202, 204, and 206 are bypassed and a user can execute a user-initiated request to change access technologies. In such an embodiment, at operation 208, a determination is made as to what subsequent access technology the user has chosen. In such an embodiment, the request for the subsequent access technology may be granted if the mobile device will be able to acquire a signal strength with the requested access technology beyond a second predetermined threshold decibel value.

At operation 210, a second video session is established between the mobile device and other devices that were connected to the mobile device in the original session. The second video session may be established using the subsequent access technology determined at operation 208. In establishing the second video session, a new communication channel may be identified to transmit the video information for the second video session.

At operation 212, an amount of space needed within the new communication channel for the second video session is determined based on the subsequent access technology. At operation 214, video information that may be sent through the new communication channel can be transcoded to a proper codec that all end points (devices within a session) can support. Such transcoding may be necessary when sessions are handed off in situations when the mobile device migrates to another access technology that may provide higher bandwidth capabilities than the access technologies of the other devices within the session.

At operation 216, data information is modified in order to allocate space within a frequency spectrum of the new channel for the video information of the second video session. Modifying the data information may include changing the amount of bandwidth for data information within the frequency spectrum of the new channel. In an embodiment, a modifier (entity modifying the data information) may need to communicate with a router, such as a BSC for example, in order to modify the data information. In an embodiment, the modifier may modify the router so that unauthorized users are prohibited from using the new channel. In an embodiment, the modifier may first have to authenticate itself with the router before the router allows itself to be modified by the modifier. For example, there may be a key exchange authentication process between the modifier and the router, and if the key exchange authentication process is successful, then the modifier may be authorized to modify the router.

At operation 218, the original video session is buffered. At operation 220, the buffered session is pushed through the allocated space within the frequency spectrum of the new channel that was reserved for the second video session. At operation 222, the original video session is terminated.

Figure 3:
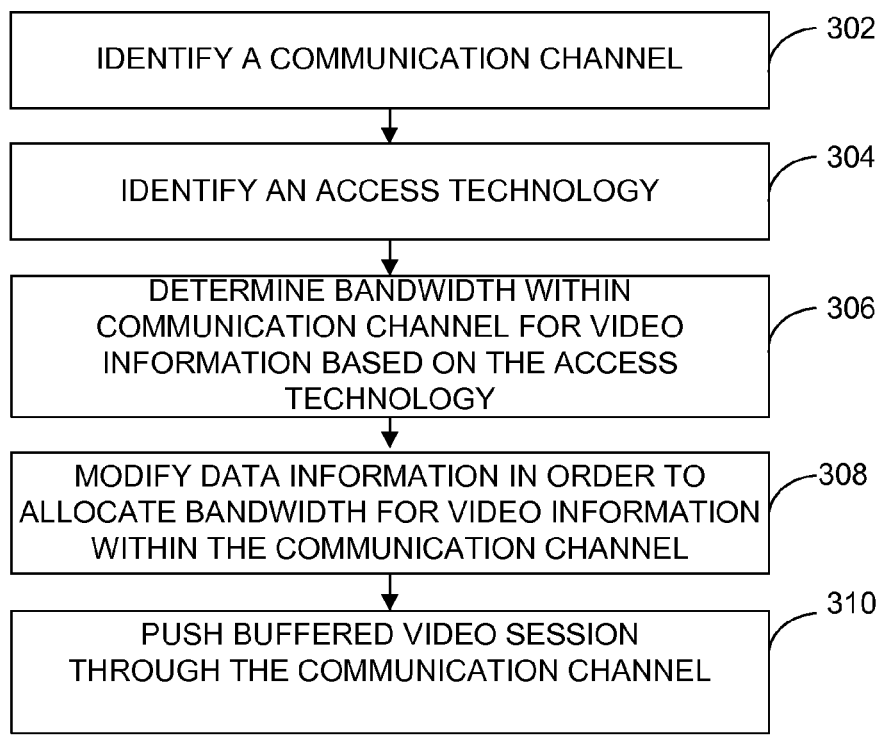
FIG. 3 is another flow diagram illustrating an embodiment of an exemplary method for managing a handoff of a video session.

Turning now to FIG. 3, another process for managing a handoff of a video session is shown in a method 300. At operation 302, a communication channel is identified. In an embodiment, the identified communication channel can be for a newly created video session. At operation 304, an access technology is identified. In an embodiment, the identified access technology may correspond to a newly created video session. At operation 306, a determination is made as to the amount of bandwidth needed for video information, wherein the determination is based on the identified access technology. At operation 308, data information within a frequency spectrum of the communication channel is modified in order to allocate bandwidth for the video information. At operation 310, a buffered video session is pushed through the allocated bandwidth space within the communication channel.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of managing a handoff of a video session including a plurality of devices, comprising:
monitoring a signal strength in a first access technology of at least one mobile device within a first video session, the first video session including the at least one mobile device and one or more devices connected with the at least one mobile device;
detecting a change in the signal strength of the at least one mobile device;
determining the signal strength exceeds a pre-determined threshold signal value;
determining the pre-determined threshold signal value is exceeded for a pre-determined threshold amount of time, where the signal strength exceeds the pre-determined threshold signal value for the pre-determined threshold amount of time;
determining the signal strength is associated with a second access technology for the at least one mobile device; and
establishing a second video session using the second access technology for the at least one mobile device and the one or more devices.

2. The method according to claim 1, further comprising:
buffering the first video session; and
playing the buffered first video session within the second video session.

3. The method according to claim 2, further comprising terminating the first video session after the first video session is buffered.

4. The method according to claim 1, wherein detecting the change in the signal strength comprises detecting the signal strength exceeding a threshold signal value for a threshold amount of time.

5. The method according to claim 1, wherein the second access technology is different from the first access technology.

6. The method according to claim 1, wherein the second access technology is the same as the first access technology.

7. The method according to claim 1, further comprising allocating a space within a frequency spectrum for the second video session in order to transmit video information.

8. The method according to claim 7, wherein allocating the space comprises modifying an amount of space of data information within the frequency spectrum.

9. The method according to claim 8, wherein an entity modifying the amount of space of data information has to first authenticate itself with a router.

10. A system for managing a handoff of a video session including a plurality of devices, comprising:
a mobility manager for detecting a change in a signal strength of at least one mobile device within a first video session, establishing a second video session using an access technology for the at least one mobile device and one or more devices connected with the at least one mobile device, and
buffering the first video session, wherein detecting the change in the signal strength of the at least one mobile device comprises determining that the signal strength exceeds a pre-determined threshold signal value and determining that the pre-determined threshold signal value is exceeded for a pre-determined threshold amount of time; and
a resource manager for determining an amount of bandwidth within the communication channel for the second video session based on the access technology, and modifying data information within a frequency spectrum of the communication channel to allocate bandwidth for the second video session within the communication channel.

11. The system according to claim 10, wherein the mobility manager pushes the buffered first video session through the allocated bandwidth within the channel.

12. The system according to claim 10, wherein the resource manager transcodes one or more items of video information to a codec based on access technologies of all devices within the first video session.

13. The system according to claim 10, wherein the mobility manager detects the change in the signal strength by detecting when the signal strength exceeds a threshold signal value for a threshold amount of time.

14. The system according to claim 10, wherein the mobility manager terminates the first video session after the first video session is buffered.

15. The system according to claim 10, wherein the resource manger authenticates itself with a router in order to manipulate the router for locking-out unauthorized users of the communication channel.

\* \* \* \* \*